(12) United States Patent
Zeng et al.

(10) Patent No.: US 12,096,434 B2
(45) Date of Patent: *Sep. 17, 2024

(54) CONTROL SIGNALING FOR WIRELESS COMMUNICATION

(71) Applicant: WIRELESS FUTURE TECHNOLOGIES INC., Ottawa (CA)

(72) Inventors: Erlin Zeng, Beijing (CN); Hai Ming Wang, Beijing (CN); Xiangguang Che, Beijing (CN); Chun Yan Gao, Beijing (CN); Peng Chen, Beijing (CN); Jing Han, Beijing (CN); Bernhard Raaf, Neuried (DE)

(73) Assignee: WIRELESS FUTURE TECHNOLOGIES, INC., Ottawa (CA)

( * ) Notice: Subject to any disclaimer, the term of this patent is extended or adjusted under 35 U.S.C. 154(b) by 343 days.

This patent is subject to a terminal disclaimer.

(21) Appl. No.: 17/557,870

(22) Filed: Dec. 21, 2021

(65) Prior Publication Data

US 2022/0116932 A1 Apr. 14, 2022

Related U.S. Application Data

(63) Continuation of application No. 16/750,835, filed on Jan. 23, 2020, now Pat. No. 11,212,782, which is a
(Continued)

(51) Int. Cl.
*H04W 72/20* (2023.01)
*H04L 5/00* (2006.01)
(Continued)

(52) U.S. Cl.
CPC ........... *H04W 72/20* (2023.01); *H04L 5/0053* (2013.01); *H04W 72/27* (2023.01); *H04B 7/2606* (2013.01); *H04W 84/047* (2013.01)

(58) Field of Classification Search
None
See application file for complete search history.

(56) References Cited

U.S. PATENT DOCUMENTS 8,335,466 B2 * 12/2012 Cai ..................... H04W 72/23
455/434
8,634,337 B2 1/2014 Kim et al.
(Continued)

OTHER PUBLICATIONS

Alcatel Shanghai Bell et al., "Relaying for LTE-Advanced," 3GPP TSG RAN WG1 Meeting #55, R1-084136, Prague, Czech Republic (Sep. 29-Oct. 3, 2008).
(Continued)

*Primary Examiner* — Brian S Roberts
(74) *Attorney, Agent, or Firm* — VOLPE KOENIG

(57) ABSTRACT

In accordance with an example embodiment of the present invention, a method comprises allocating a control channel resource in a wireless relay transmission frame on a wireless relay link; generating a control signaling based on at least one of a resource allocation scheme, a status of the wireless relay link and a traffic condition of the wireless relay link; mapping the control signaling to the allocated control channel resource via at least one of a time-first mapping, a frequency-first mapping, and a multiplexing mapping; and transmitting the control signaling in the allocated control channel resource on the wireless relay link to at least one associated relay node.

18 Claims, 8 Drawing Sheets

Related U.S. Application Data continuation of application No. 15/934,226, filed on Mar. 23, 2018, now Pat. No. 10,548,116, which is a continuation of application No. 14/725,526, filed on May 29, 2015, now Pat. No. 9,936,484, which is a continuation of application No. 14/021,622, filed on Sep. 9, 2013, now Pat. No. 9,048,989, which is a continuation of application No. 12/390,267, filed on Feb. 20, 2009, now Pat. No. 8,532,015.

(51) Int. Cl.
*H04W 72/27* (2023.01)
*H04B 7/26* (2006.01)
*H04W 84/04* (2009.01)

(56) References Cited

U.S. PATENT DOCUMENTS

| | | | |
|---|---|---|---|
| 8,824,389 | B2 | 9/2014 | Chung et al. |
| 8,837,421 | B2 | 9/2014 | Tiirola |
| 9,014,073 | B2 | 4/2015 | Park et al. |
| 9,288,021 | B2 | 3/2016 | Zhang et al. |
| 9,419,832 | B2 | 8/2016 | Yamada et al. |
| 10,548,116 | B2 | 1/2020 | Zeng et al. |
| 11,212,782 | B2 * | 12/2021 | Zeng .............. H04L 5/0053 |
| 2007/0087691 | A1 | 4/2007 | Lee et al. |
| 2008/0039011 | A1 | 2/2008 | Chang et al. |
| 2008/0056173 | A1 | 3/2008 | Watanabe |
| 2008/0080423 | A1 * | 4/2008 | Kolding ........... H04L 1/1854 |
| | | | 370/329 |
| 2009/0022178 | A1 | 1/2009 | Ji et al. |
| 2009/0046793 | A1 * | 2/2009 | Love ............... H04L 1/1607 |
| | | | 375/260 |
| 2009/0074090 | A1 | 3/2009 | Xu et al. |
| 2009/0097466 | A1 | 4/2009 | Lee et al. |
| 2009/0147706 | A1 | 6/2009 | Yu et al. |
| 2010/0246604 | A1 | 9/2010 | Kim et al. |
| 2011/0064115 | A1 | 3/2011 | Xu et al. |
| 2011/0126068 | A1 | 5/2011 | Lee et al. |
| 2011/0149903 | A1 | 6/2011 | Krishnamurthy et al. |
| 2011/0164545 | A1 | 7/2011 | Koo et al. |
| 2011/0194412 | A1 | 8/2011 | Park et al. |
| 2011/0274046 | A1 * | 11/2011 | Rune ............... H04W 60/00 |
| | | | 370/328 |
| 2011/0274066 | A1 | 11/2011 | Tee et al. |
| 2012/0033588 | A1 | 2/2012 | Chung et al. |
| 2012/0195240 | A1 | 8/2012 | Kim et al. |
| 2013/0010681 | A1 | 1/2013 | Xu et al. |
| 2013/0044712 | A1 | 2/2013 | Kim |
| 2013/0107797 | A1 | 5/2013 | Chion et al. |

OTHER PUBLICATIONS

AT&T et al., "WF on addressing forward compatibility in Rel-8," 3GPP TSG-RAN WG1 #55, R1-084651, Prague, Czech Republic (Nov. 10-14, 2008).

Ericsson, "A discussion on some technology components for LTE-Advanced," TSG-RAN WG1 #53, R1-082024, Kansas City, MO, USA (May 5-9, 2008).

Ericsson, "Efficient support of relays through MBSFN subframes," TSG RAN WG1 #55, R1-084357, Prague, Czech Republic (Nov. 10-14, 2008).

Ericsson, "Wireless relaying for the LTE evolution," TSG-RAN WG1 #54bis, R1-083752, Prague, Czech Republic (Sep. 29-Oct. 3, 2008).

IEEE Standard for Local and metropolitan area networks; Part 16: Air Interface for Fixed Broadband Wireless Access Systems, IEEE Std. 802.16-2004 (Oct. 1, 2004), pp. viii and 8.

LG Electronics, "Consideration on Resource Allocation for Relay Backhaul Link," 3GPP TSG RAN WG1 Meeting #56, R1-090790, Athens, Greece (Feb. 9-13, 2009).

LG Electronics, "Text Proposal for TR36.814 on backhaul for relays," TSG-RAN WG1 Meeting #56, R1-090841, Athens, Greece (Feb. 9-13, 2009).

Motorola, "LTE signaling to support Relay operation," 3GPP TSG RAN WG1 Meeting #55, R1-084412, Prague, Czech Republic (Nov. 10-14, 2008).

Motorola, "Summary of Design Considerations for Supporting Relays in TDD and FDD Modes," 3GPP TSG RAN1 #56, R1-090807, Athens, Greece (Feb. 9-13, 2009).

Nokia Siemens Networks et al., "Backward compatible implementation of Relaying," 3GPP TSG RAN WG1 Meeting #55, R1-084325, Prague, Czech Republic (Nov. 10-14, 2008).

Nortel, "Supporting relay for Rel-8 UE in downlink," 3GPP TSG-RAN1 Meeting #55, R1-084460, Prague, Czech Republic (Sep. 29-Oct. 3, 2008).

Panasonic, "Requirements for LTE advanced," REV-080006 (Apr. 7, 2008).

Panasonic, "Technical proposals and considerations for LTE advanced," 3GPP TSG RAN WG1 Meeting #53, R1-081791, Kansas City, MO, USA (May 5-9, 2008).

QUALCOMM Europe, "Specifying blank subframes for efficient support of relays," 3GPP TSG-RAN WG1 #54bis, R1-083817, Prague, Czech Republic (Sep. 29-Oct. 3, 2008).

Third Generation Partnership Project, "Technical Specification Group Radio Access Network; Evolved Universal Terrestrial Radio Access (E-UTRA); Physical channels and modulation" (Release 8), 3GPP TS 36.211 V8.4.0 (Sep. 2008).

* cited by examiner

CONTROL SIGNALING FOR WIRELESS COMMUNICATION

CROSS-REFERENCE TO RELATED APPLICATIONS

This application is a continuation of U.S. patent application Ser. No. 16/750,835, filed Jan. 23, 2020, which is a continuation of U.S. patent application Ser. No. 15/934,226, filed Mar. 23, 2018, which issued on Jul. 26, 2018, as U.S. Pat. No. 10,548,116, which is a continuation of U.S. patent application Ser. No. 14/725,526, filed May 29, 2015, which issued on Apr. 3, 2018, as U.S. Pat. No. 9,936,484, which is a continuation of U.S. patent application Ser. No. 14/021,622, filed Sep. 9, 2013, which issued on Jun. 2, 2015 as U.S. Pat. No. 9,048,989, which is a continuation of U.S. patent application Ser. No. 12/390,267, filed Feb. 20, 2009, which issued on Sep. 10, 2013 as U.S. Pat. No. 8,532,015, all of which are incorporated by reference as if fully set forth.

TECHNICAL FIELD

The present application relates generally to methods and apparatuses for transmitting control signaling over a wireless relay link to support extended coverage and improved quality of service.

BACKGROUND

To help achieve extended network coverage, improve service quality, and provide services such as wireless broadcast TV on user equipments, wireless relay links are being developed for a new generation of network technologies such as $4^{th}$ generation (4G) wireless networks. A wireless relay link is a wireless connection between a radio access node and a relay node so that the access node may be coupled to an end user device or user equipment via the relay node. Otherwise the user equipment may be out of the reach of the access node or receive a poor-quality service from the access node.

Control signaling is a part of a wireless relay link because it enables communications between the access node and the relay node. The access node may send control instructions such as an access grant, a transmission acknowledgement, and a negative transmission acknowledgement, among others, to the relay node via the control signaling. With control signaling, a connection may be set up between the access node and the relay node, resource may be allocated, a transmission error between the two may be detected and corrected. The control signaling may take place at any one of the layers of open system interconnection (OSI) network model, including the physical layer, also termed layer 1, the data link and radio link control layer, also termed layer 2, and the network layer, also termed layer 3.

Although there are some existing control signaling schemes for wireless technologies based on standards such as IEEE 802.16 standards and existing $3^{rd}$ generation partnership project (3GPP) standards, the existing control signaling schemes do not meet the needs of a new generation of wireless technologies such as 4G networks to support new generation of wireless services such as broadcast TV on user equipments.

SUMMARY

Various aspects of examples of the invention are set out in the claims.

According to a first aspect of the present invention, a method comprises allocating a control channel resource in a wireless relay transmission frame on a wireless relay link; generating a control signaling based on at least one of a resource allocation scheme, a status of the wireless relay link and a traffic condition of the wireless relay link; mapping the control signaling to the allocated control channel resource via at least one of a time-first mapping, a frequency-first mapping, and a multiplexing mapping; and transmitting the control signaling in the allocated control channel resource on the wireless relay link to at least one associated relay node.

According to a second aspect of the present invention, an apparatus comprises an upper-layer control module configured to allocate a control channel resource in a wireless relay transmission frame on a wireless relay link, and to generate a control signaling based on at least one of a resource allocation scheme, a status of the wireless relay link and a traffic condition of the wireless relay link. The apparatus also comprises a physical-layer control module configured to map the control signaling to the allocated control channel resource via one of a time-first mapping, a frequency-first mapping, and a multiplexing mapping; and to transmit the control signaling in the allocated control channel resource on the wireless relay link to at least one associated relay node.

According to a third aspect of the present invention, An apparatus comprises a control module configured to determine a decoding set for a received wireless relay transmission frame; and to determine a starting point and a length of a control signaling. The apparatus also comprises a decoding module configured to decode the received wireless relay transmission frame received from an associated wireless access node; to detect a beginning of the control signaling embedded in the wireless relay transmission frame based on the decoding set; and to extract the control signaling from the decoded wireless relay transmission frame using the starting point and the length of the control signaling.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Among the challenges to be address by the present disclosure is the development of methods and apparatus that may efficiently allocate control channel resource in a wireless relay transmission frame and map the control signaling to the allocated control channel resource in a flexible manner to accommodate different traffic conditions for different wireless services. Another challenge is to make the control signaling on the relay link backward compatible so that the existing network nodes and user equipments (UEs) may not be retooled to support the new control signaling.

FIGS. 1 through 8, discussed below, and the various embodiments used to describe the principles of the present disclosure in this patent document are by way of illustration only and should not be construed in any way to limit the scope of the invention. Those skilled in the art will understand that the principles of the present disclosure may be implemented in any type of suitably arranged device or system.

Figure 1:
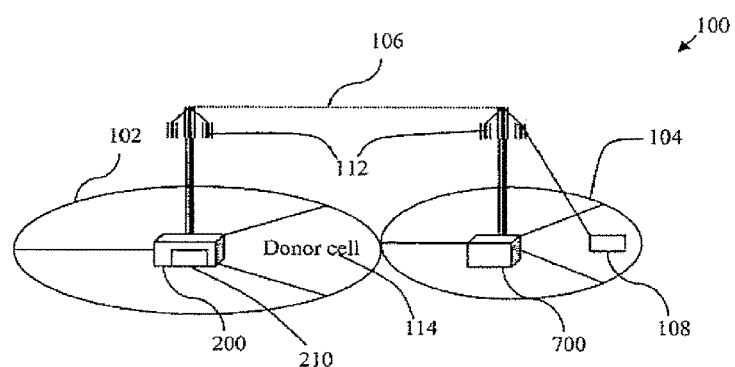
FIG. 1 illustrates an example wireless relay system.
Figure 2:
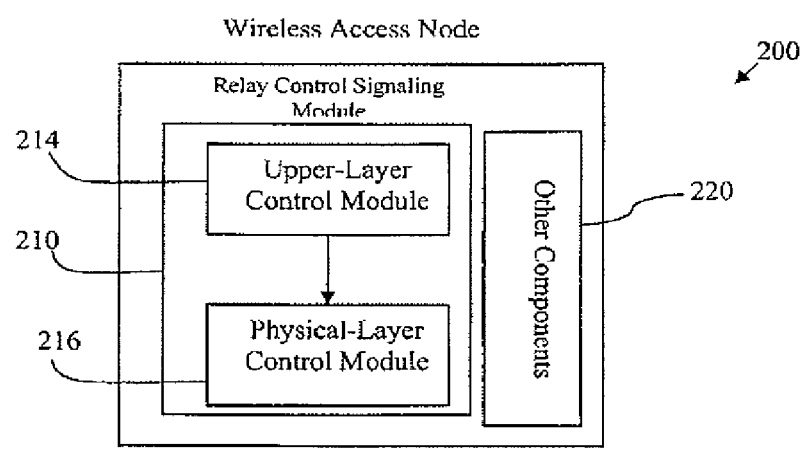
FIG. 2 illustrates an example embodiment of a wireless access node.

FIG. 1 illustrates an example wireless relay system. The example wireless relay system 100 includes one wireless access node 200 and a relay node 700. The wireless access node 200 may be located in a wireless cell 102 and is coupled to a transmission tower 112. The relay node 700 may be located in an adjacent relay cell 104 and coupled to another transmission tower 112. The wireless access node 200 may include a relay control signaling module 210 and communicate with the relay node 700 via a wireless relay link 106. In a way, the wireless relay node 700 may be viewed as an extension to the access node 200 to reach an end user equipment 108 which may be a mobile station. The access node 200 may communicate with the relay node 700 at layers that may include but not limited to the physical layer, data link layer and network layer, which are also referred to as layer 1, layer 2 and layer 3 in the OSI network model. More details of the access node 200 are illustrated in FIG. 2 and described hereinafter. More details of the relay node 700 are illustrated in FIG. 700 and described hereinafter.

In one embodiment, the wireless access node 200 may be a long term evolution (LTE) radio access node (eNodeB) and the relay node 700 may be a $3^{rd}$ generation project group (3GPP) access node (NodeB). In such an embodiment, an eNodeB in the cell 102 may extend to the relay node 700, and this communication at the layer 3 between the cell 102, also called donor cell, and the relay node 700 is also called layer 3 relay or self-backhauling. The "layer 3 relay" node may be an eNodeB supporting one or more cells of its own. The layer 3 relay node is accessible to LTE Release 8 user equipments and provides a downlink control signaling. The control signaling contents may include a control instruction on a primary synchronization channel (P-SCH), a secondary synchronization channel (S-SCH), a physical broadcast channel (P-BCH) and a common reference signal (CRS). The P-SCH and S-SCH channels may be used to synchronize an end user equipment with the associated network after a power up. A P-BCH channel may be used to broadcast common control information such as network parameter settings to all associated user equipments which are synchronized to the network. A CRS may be transmitted by an eNodeB to associated end user equipments in its coverage, for the purpose of channel measurement and channel synchronization to allow the UEs to access a layer 3 relay cell such as the relay cell 104. In one embodiment, the layer 3 relay node, after being connected wirelessly with the eNodeB such as the access node 200, may provide same service to end users in its converge, just as an eNodeB may. The layer 3 relay node such as the relay node 700 may have a wireless connection to eNodeB, in order to reach an associated core network. The relay node 700 is wirelessly coupled to other part of a radio access network via a donor cell 114, which may typically provide a larger coverage.

The control signaling between the access node 200 and the relay node 700 may be carried on the wireless relay link 106 and may be either an inband control signaling or outband control signaling. An inband signaling is carried on a wireless link between the two nodes using the same frequency band. An outband signaling may use a relay link that uses a frequency band that is different from that of the access node 200. The outband resources with a powerful amplifier for the eNodeB layer 3 relay link may make the backhaul link an add-on to eNodeB. But the outband resource may use a designated spectrum and thus complicate network deployments due to different spectrum allocations in different countries. Thus the relay link using outband resource may add additional cost and also to the donor cell 114. The present disclosure focuses on the inband control signaling that may achieve significant link gains via antenna tilting and adequate positioning of the relay node and a reduction of shadowing loss. A shadowing loss may be a large-scale fading loss of wireless channel and may change with the location of the transmitter and the receiver of the access node. The shadowing loss in general may not change very frequently and may be modeled as a random variable with variance up to several decibels. Usable bandwidth for the self-backhauling may depend on the number of user equipments (UEs) coupled to the layer 3 relay node and the traffic load on the relay link.

FIG. 2 illustrates an example embodiment of a wireless access node 200. The wireless access node 200 may include a relay control signaling module 210. The relay control signaling module 210 may include an upper-layer control module 214 and a physical-layer control module 216. The wireless access node 200 may also include a collection 220 of other components of the access node 200. Examples of the other components may include air interface module and a power module.

The upper layer control module 214 may be configured to determine a starting point in a wireless relay transmission frame for carrying a control signaling and a length of the control signaling. The upper layer control module 214 may also be configured to allocate wireless channel resource for the wireless relay link to carry payload data and the control signaling, using one of resource allocation schemes. The resource allocation scheme may be a semi-static, dynamic, or hybrid resource allocation. A semi-static scheme allocates a relay link for a relatively longer time period before a change takes place, for example, for a few seconds, to accommodate relatively stable traffic pattern. The dynamic resource allocation scheme may allocate the relay link on a dynamic basis, for example, on a millisecond basis, to accommodate a more dynamic traffic pattern. One effect of the dynamic resource allocations may be for a better accommodation of fast traffic change and also for a potential scheduling gain over fast fading of wireless channels. The hybrid resource allocation scheme is a mix of the dynamic resource allocation and the static resource allocation. The upper layer control module 214 may also be configured to generate a control signaling based on at least one of a resource allocation scheme, a status of relay link, a traffic condition in the relay node, and/or the like. The upper layer control module 214 may be located at a layer above the data link layer or the layer 2 and may be at the network layer, or layer 3 of the OSI model.

The physical-layer control module 216 may be configured to locate a starting point of the control signaling within the wireless relay transmission frame and map a control signaling to one or more allocated control signaling resources. The physical-layer control module 216 may transmit control signaling on the wireless downlink to the relay node 700. The downlink control signaling may include resource grants, acknowledgement and negative acknowledgement to a transmission from the relay node 700. The physical-layer control module 216 may be configured to map the control signaling to the allocated control channel resource via one of a time-first mapping, a frequency-first mapping, a multi-plexing mapping and/or the like. The physical-layer control module 216 may be configured to transmit the control signaling to multiple associated relay nodes at the same time.

The collection 220 of other components may include air interface module, a power module, and other modules that make up the wireless access node 200. Examples of the other modules may include a radio frequency module, a transceiver module, a baseband signal processing module. The radio frequency module may turn a baseband signal into a radio frequency band. The transceiver module with at least one antenna set may transmit and receive the radio signals, and the baseband signal processing module may perform coding, modulation and other signal processing.

Figure 3:
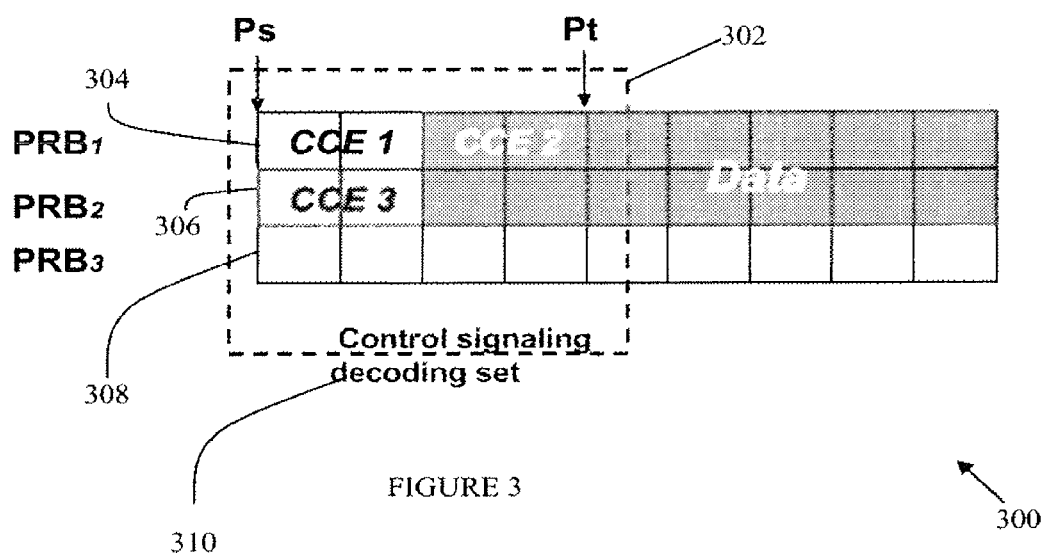
FIG. 3 illustrates an example of a partial wireless relay transmission frame.

FIG. 3 illustrates an example of a partial wireless relay transmission frame 300 to illustrate an example of resource allocation for the control signaling on a wireless relay link. The example of the partial wireless relay transmission frame 300 shows three physical resource blocks (PRBs), e.g., PRB1 304, PRB2 306, and PRB3 308 respectively. A PRB may contain a number of control channel elements (CCEs). In one embodiment, a portion 302 of the PRBs is the part of the wireless relay transmission frame 300 that is used for carrying the control signaling. The portion 302 may otherwise be left unused if not used to carry the relay control signaling. One embodiment of the wireless relay transmission frame may be a multicast/broadcast over single frequency network (MBSFN) sub-frame as specified in the LTE Release 8. The MBSFN sub-frame may be used to support service feature such as broadband TV on handsets. In some cases, the resources on transmission frame may not be fully utilized due to a variety of reasons. For example, LTE Release 8 compliant UEs may ignore the last several symbols, e.g., 10 symbols, in a 1-millisecond (ms) MBSFN sub-frame. In addition to the regular 1-ms MBSFN sub-frame, there is another type of MBSFN sub-frame with zero control symbols, or zero-control-symbol MBSFN sub-frame, that may not carry any control symbols or reference signals. For example, LTE Release 8 compliant UEs may not expect and thus may not process any control signaling or reference signals after receiving a zero-control-symbol MBSFN sub-frame. However, the relay control signaling module 210 of FIG. 2 may accommodate both the regular MBSF sub-frame and the zero-control-symbol MBSFN sub-frame for the control signaling on the relay link 106.

One embodiment of the wireless relay transmission frame 300 is an MBSFN sub-frame for which three PRBs, for example, PRB1 to PRB3 may be allocated for the relay link. There is a total of nine symbols available in the MBSFN sub-frame for carrying the control signaling. For example, a starting point of control channel resource, Ps in FIG. 3, is determined by a combination of 1) the index of the first symbol available for the relay link, 2) the index of PRB1. These two parameters may be configured by the upper layer control module 214 in a semi-static fashion in order to simplify the implementation and complexity of resource allocation and also to reduce the total control signaling overhead. The size of the CCEs in the example is assumed to contain two adjacent symbols within PRB1 304, as shown in the FIG. 3. However, the actual size of CCEs within a PRB may be further optimized according to the quality of relay link and the content of the control signaling. The number of symbols that may be used for control signaling is determined by Pt as in the FIG. 3. For example, if Ps is at symbol k, the symbols from k to Pt, represented as $\Delta k$, may be used for control signaling, where $Pt=k+\Delta k$. $\Delta k$ may be indicated by the control signaling transmitted in relay sub-frame. To simplify the detection by the receiving relay node 700, this "indication information" may be mapped to a pre-defined time/frequency resource. For example, it may be transmitted in the first CCE, e.g., CCE1, as shown in FIG. 3.

In one embodiment of the wireless relay transmission frame 300, the control channels may be mapped to the CCEs, e.g., CCE1, CCE2, and CCE3 in a time-first fashion. As a result, when the symbol index reaches Pt, the CCE on the next PRB may be mapped to the control signaling. After the control signaling is mapped to the control channel elements, the payload data may be mapped to the PRBs which contain at least one control CCE, and the range of data symbols may start at Ps and end at the maximum number of symbol available in the MBSFN sub-frame on the relay link. In another embodiment, the access node 200 may decide the parameter Pt based on at least two parameters: 1) a total number of control CCEs that may be needed on relay link, and 2) the number of data symbols to be transmitted within the wireless relay transmission frame on the relay link. Based on the two parameters, Pt may be determined in such a way that the number of symbols that is not used may be minimized. The number of PRB(s) allocated to a relay node on the relay link may be either fixed or dynamic. If a fixed allocation is used, it may be simpler for the relay node 700 to process the control signaling detection and processing. If the PRB(s) are dynamically allocated, it may be more complicated for the relay node 700 to detect and process the control signaling.

Figure 4:
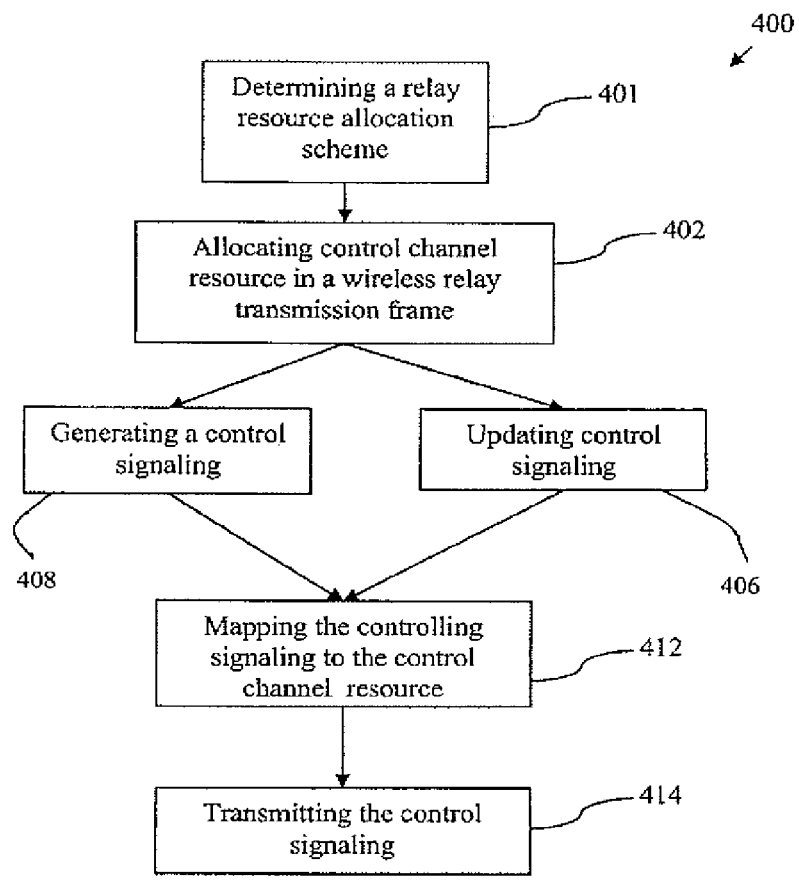
FIG. 4 illustrates an example method for transmitting control signaling on a wireless relay link.

FIG. 4 illustrates an example method 400 for transmitting control signaling on a wireless relay link. The method 400 may include determining a relay resource allocation scheme at block 401, allocating a control channel resource in a wireless relay transmission frame at block 402, generating a control signaling at block 408, updating the control signaling at block 406, mapping the control signaling to the allocated control channel resource at block 412, and transmitting the control signaling over the relay link at block 416. The embodiment of the method 400 shown in FIG. 4 is for illustration only. Other embodiments of the method 400 with different sequences of steps could be used without departing from the scope of this disclosure. In an example embodiment, the method 400 is performed by the access node 200 in FIG. 1 and FIG. 2.

Determining a resource allocation scheme at block 401 may include determining a channel resource allocation scheme based on a relay link status, a traffic pattern at the relay node, and the type of the selected wireless relay transmission frame. A dynamic channel resource allocation scheme may be used if traffic on the relay is very dynamic and control signaling overhead is light. On the other hand, if the traffic in the relay node is light and does not change frequently, a semi-static allocation scheme may be more suitable. A hybrid allocation scheme may be used for cases where a portion of the traffic may be dynamic and a portion less dynamic.

Allocating control channel resource at block 402 may include identifying at an upper layer a type of a wireless relay transmission frame, and a total number of control channel elements allocated for the downlink control signaling according to the frame type identified. Allocating control channel resource at block 402 may also include identifying a starting point in the wireless relay transmission frame such as Ps in FIG. 3 and a length of the control channel resource, and sending the starting point and the length of available resource information to the physical control module 216 to perform the control signaling transmission.

Allocating the control channel resource at block 402 may also include identifying control channel resource according to a wireless relay transmission frame type. In one embodiment, allocating the control resource at block 402 may include identifying either regular MBSFN or zero-control-symbol MBSFN sub-frames. Allocating a regular MBSFN sub-frame may include identifying a starting position of the control channel resource in the regular MBSFN sub-frame for the control signaling. On the other hand, allocating a zero-control-symbol MBSFN sub-frame may include identifying a different starting position of the control channel resource.

Generating the control signaling at block 408 may take place when the contents of a control signaling is newly generated in cases such as a connection setup or the like. Generating the control signaling at block 408 may include deciding a control signaling appropriate for the type of wireless relay transmission frame and generating one or more control signaling contents according to the wireless relay transmission frame type. In one embodiment, generating the control signaling at block 408 may include generating a channel access grant, a resource allocation scheme, and a resource allocation status indicator, among others. In another example embodiment, generating the control signaling at block 408 may include generating a resource allocation status when the resource is semi-statically allocated. If the control channel resources other than a semi-persistently allocated ones are used by the relay link, some additional CCEs for the control signaling may be transmitted to indicate the dynamic allocations. Thus generating control signaling at block 408 may include using these additional control CCEs to indicate a resource allocation status. The status may indicate whether additional resources besides the semi-statically allocated ones are also available for the relay node, whether the semi-statically allocated resources are reserved or released by the relay link in the wireless relay transmission frame, whether some resources other than the semi-allocated ones are allocated to relay node in the wireless relay transmission frame, and the like.

Generating the control signaling at block 408 may include generating control signaling based on the control channel resource allocation. When dynamic resource allocation is used for the relay link, generating control signaling may include generating downlink resource grants and acknowledgement and negative acknowledgement for Hybrid Automatic Repeat-reQuest (HARQ) for the downlink physical layer control signaling. HARQ control signaling may support physical layer re-transmission in LTE Release 8 compliant devices by feeding back an acknowledge or a negative acknowledgement to the transmitting side of the relay link. In a hybrid manner, retransmission of control signaling or payload data may be encoded differently from that of the transmission.

Generating the control signaling at block 408 may also include generating a location indicator in the wireless relay transmission frame. Generating the control signaling may further include generating the offset k and the Δk to indicate the location of the control signaling where k may indicate the location of first usable symbol and Δk the length of usable symbols in allocated control resource in the wireless relay transmission frame.

Generating the control signaling at block 408 may also include generating a second control signaling to support reallocation of channel resources for the relay link that was left unused for a previous transmission to achieve an improved resource utilization. Some channel resources may not be fully allocated for wireless relay links due to various reasons such as dynamic traffic conditions and a specific design of a wireless relay transmission frame format. In one embodiment, a second control signaling may support a flexible resource allocation through resource re-allocation by including a resource grant together with a bitmap to indicate the resource allocations for the subsequent relay frames. For example, this method may be used to reallocate channel resource for relay link for both the MBSFN sub-frames and the zero-control-symbol MBSFN sub-frames.

Generating the control signaling at block 408 may also include configuring the content of the downlink physical layer control signaling according to the characteristic of relay link and the traffic load in the relay node 700. For example, when little variation occurs on either relay link or traffic load of the relay node 700, the resource allocation on relay link may stay unchanged. In this case, the downlink access grant may not be transmitted in order to reduce the control signaling overhead, and the downlink physical layer control signaling may be configured to only contain acknowledgement and negative acknowledgement for the associated uplink process.

Updating the control signaling at block 406 may include adding, deleting or modifying the control signaling contents for a subsequent transmission. In an example embodiment, previous control signaling contents may be saved and modified for a subsequent control signaling. The subsequent transmission may use a different resource allocation scheme and a type of wireless relay transmission frame different from the current one. For example, the resource allocation scheme may change from a semi-static one to a dynamic one. While the current wireless relay transmission frame may be a MBSFN sub-frame, the subsequent transmission frame may be a zero-control-symbol MBSFN sub-frame.

Mapping the control signaling to the allocated control channel resource at block 412 may include determining a mapping scheme, and mapping the control signaling to the allocated control channel resource in the wireless relay transmission frame. The mapping scheme may be a time-first mapping, a frequency-first mapping, or a multiplexing mapping. In one embodiment, mapping the control signaling at block 412 may also include multiplexing the control channel elements for multiple relay nodes within certain PRB(s) to minimize the resource consumption. In another embodiment, when resource grants are not needed because of small variation in relay link traffic, mapping the control signaling may include multiplexing the downlink control signalings destined for multiple relay nodes in one or more PRB(s) to reduce the control signaling overhead. Mapping the control signaling at block 412 may also include mapping the control signaling in a frequency-first fashion. The number of PRB(s) used and the actual number of control signaling symbols may be determined based on the amount of control signaling data and payload data in such a way that the payload data plus the control signaling data on the relay link may make a maximum use of PRBs reserved for the relay link.

Transmitting the control signaling at block 414 may include encoding the control signaling contents into carrier symbols of wireless relay transmission frame and transmitting the wireless relay transmission frame to one or more associated relay nodes. Transmitting the control signaling may also involve transmitting part of control signaling in time domain and part in frequency domain. In one embodiment, transmitting the control signaling at block 414 may include transmitting the zero-control-symbol MBSFN sub-frames, starting from the second symbol in a MBSFN sub-frame, thus causing no interference to other control signaling such as an existing LTE Release 8 downlink control signaling.

Figure 5:
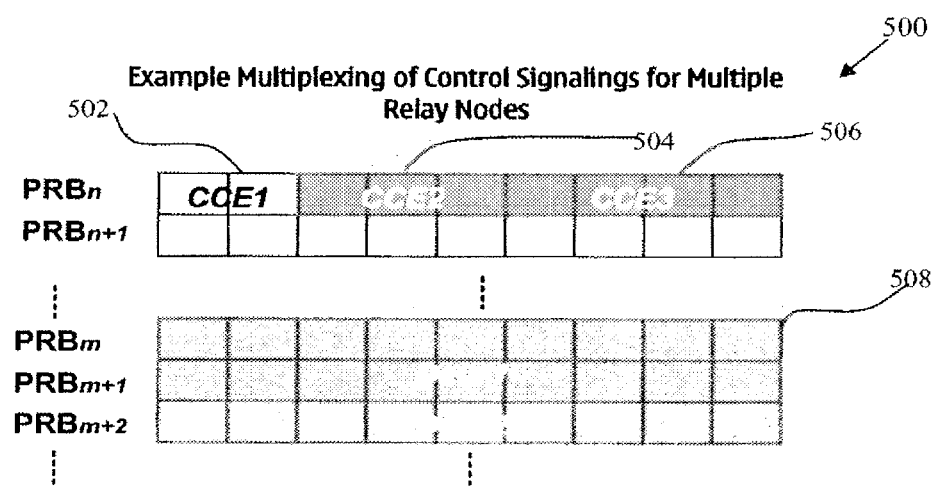
FIG. 5 illustrates an example embodiment of multiplexing multiple control signalings into a wireless relay transmission frame on a relay link.

FIG. 5 illustrates an example embodiment 500 of multiplexing multiple control signalings into one wireless relay transmission frame on a relay link. In one embodiment, to reduce the waste of channel resource, one or multiple PRBs may be reserved for relay link control, and multiple control signalings intended for multiple relay nodes may be multiplexed within the reserved resource PRBs. Multiplexing of control signalings may be a time division multiplexing, a frequency division multiplexing or a code division multiplexing. In the example embodiment shown in FIG. 5, PRBn is the reserved resource for control signaling. The other PRBs 508 in the wireless relay transmission frame, namely, PRBn+1, PRBm, PRBm+1, and PRBm+2 are allocated for carrying payload data. The control signalings may be multiplexed, e.g., onto the allocated control channel elements 502 of the PRBn. In this embodiment, a first part of the reserved PRBn, CCE1 502 of two symbols may be allocated for control signaling intended for a relay node N1, a second part, CCE2 504 of three symbols for a relay node N2, and a third part, CCE3 506 of four symbols for a relay node N3. The control signalings may be protected by means of cyclic redundancy check, which may help ensure the correct detection by each relay node. In this way, a relay node may assume several possible sizes of the control signaling, and perform blind detection to extract the control signaling. This flexibility may help the access node 200 fit the signaling control into an integer multiples of PRBs and avoid resource waste. The control signaling itself may indicate which PRB(s) are used for payload data transmission and in this example, the payload data may be mapped to the block of PRBs 508.

Figure 6:
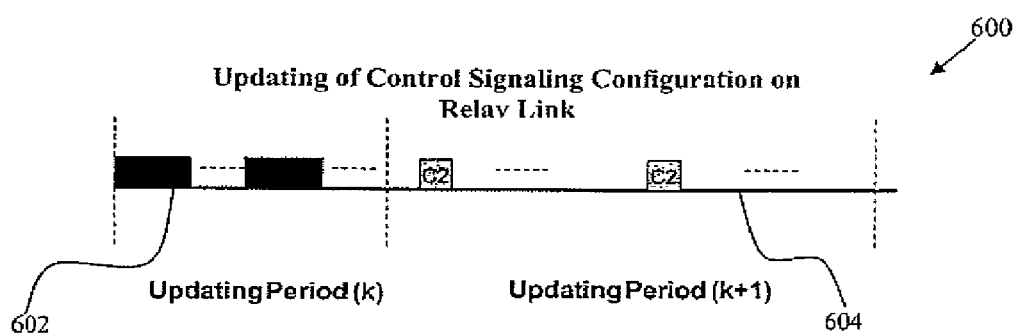
FIG. 6 illustrates an example embodiment of updating control configuration on a wireless relay link.

FIG. 6 illustrates an example embodiment 600 of updating control configuration on a relay link. The embodiment 600 includes a first update period 602 and a second update period 604. A control signaling may be updated from time to time to accommodate a condition such as a change of traffic conditions on the relay link. For example, when connections are set up and torn down frequently on the relay link and if the traffic on the relay downlink is very dynamic, the control signaling may be updated very frequently. On the other hand, if a traffic pattern on the relay link is known to be relatively static, control signaling may be updated less frequently to reduce the signaling overhead and optimize the throughput.

In one embodiment, an upper layer module such as the upper-layer control module 214 of FIG. 2 helps determine the first update period k 602 when the control signaling is updated. When the upper-layer control module 214 decides that there is not a need for an update in the subsequent update period k+1 604 for reasons such as a moderate variation in traffic pattern, the control signaling C2 may be configured in such a way that it does not contain any resource grant to accommodate the change in traffic condition. The durations of updating periods may also vary according to the control signaling contents. For the example shown in FIG. 6, the duration for the updating period k may be much shorter than that of updating period (k+1) to accommodate the different control signaling contents.

Figure 7:
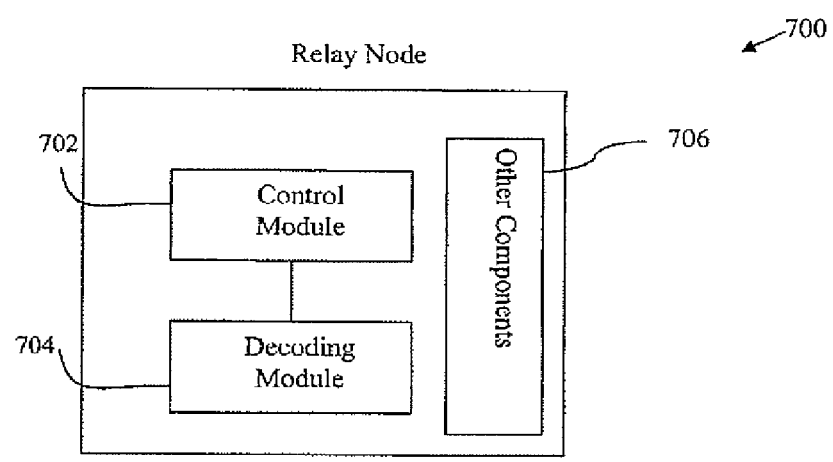
FIG. 7 illustrates an example embodiment of a wireless relay node.

FIG. 7 illustrates an example embodiment relay node 700. The relay node 700 includes a control module 702, a decoding module 704, and a collection 706 of other modules. The decoding module 704 may be configured to receive a wireless relay transmission frame from the associated wireless access node 200, decode both payload data and the control signaling if the control signaling is present, extract the control signaling from the control channel resource, and execute one or more control instructions in the control signaling.

The control module 702 may be configured to determine a starting point of the control signaling if present and the length of the control signaling, and pass the starting point and the length to the decoding module 704. The collection of other functional module 706 may include a power module, an air interface module, a baseband signal processing module, a radio frequency operating module, and a transceiver module with one or more antennas.

In one example embodiment, the control module 702 may be configured to define a control signaling decoding set 302, or a decoding set for short, as shown in FIG. 3. The decoding set may include a combination of multiple decoding rules indexed by relay transmission frame types or other parameters. After decoding a first control channel element, the relay node 700 may extract the "indication information" from the control channel resources and identify the ending point of the control channel elements. The relay node 700 may search over all extracted control channel elements based on the starting indicator and an ending indicator as provided in the decoding set. The decoding set may be designed based on different levels of complexity in correspondence to different levels of granularity of resource utilization. One example of a simple decoding set include only a maximal number of control channel elements that may be used for control signaling on the relay link. Different relay nodes may have different decoding sets to accommodate different traffic conditions of the relay nodes.

In another embodiment, the relay node 700 may receive a regular MBSFN sub-frame on a downlink from an LTE eNodeB. The control signaling may include an access channel grant during a connection setup between the eNodeB and the relay node 700. The decoding module 704 may decode the MBSFN sub-frame, identify the control channels elements, starting from the beginning of the portion of the MBSFN sub-frame that was allocated for the control signaling, and extract the control signaling from the control channel elements. For example, if the control signaling includes an access grant, the control module 704 may proceed to help set up a requested connection in collaboration with other modules of the relay node 700.

Figure 8:
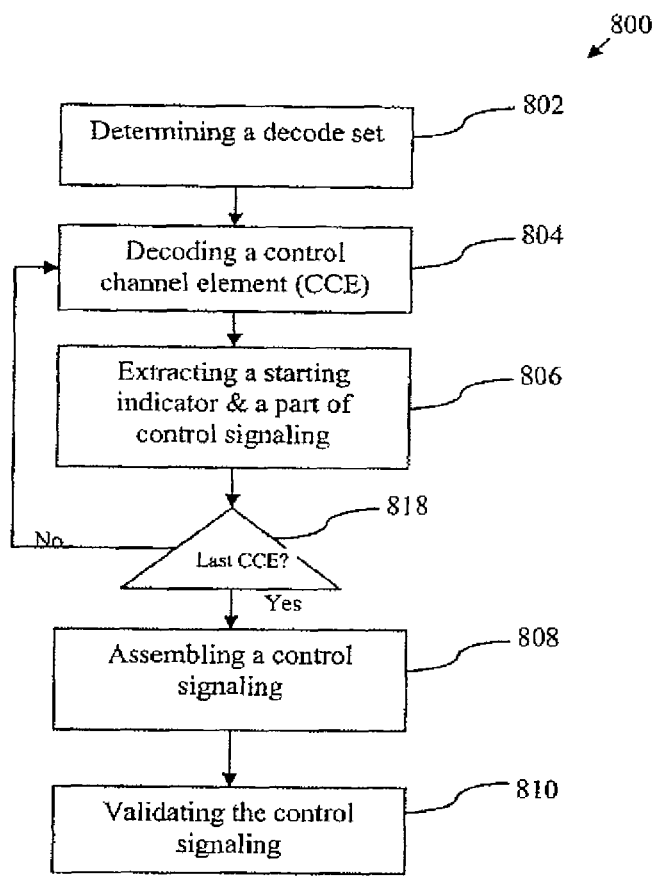
FIG. 8 illustrates an example method for decoding the control signaling.

FIG. 8 illustrates an example method 800 for decoding the control signaling, for example, at the relay node 700. The method 800 comprises determining a decoding set at block 802, decoding a control channel element at block 804, extracting a starting indicator from the decoded control channel element and extracting at least a part of control signaling using the starting indicator at block 806, assembling a control signaling at block 808, and validating the extracted control signaling at block 810. The embodiment of the method 800 shown in FIG. 8 is for illustration only. Other embodiments of the method 800 with different sequences of steps could be used without departing from the scope of this disclosure. In an example embodiment, the method 800 is performed by the relay node 700 of FIG. 1 and FIG. 7.

Determining the decoding set at block 802 may further include determining a starting point, a length, and a maximum number of control channel elements, among others for the control signaling. Determining the decoding set at block 802 may also include considering a level of complexity of decoding operation and a desired level of granularity of resource utilization. Finer the granularity level of resource utilization is, more complicated is the control signaling, and thus more complicated is the decoding set. Decoding control channel element at block 804 may include decoding an entire wireless relay transmission frame and extracting the control channel elements one at a time according to the information in the decoding set. Extracting the starting indicator at block 806 may further include identifying the starting indicator based on the information in the decoding set, and locating the indicator in a decoded control channel element.

Deciding whether the current control channel element is the last one allocated for the control signaling at block 818 may involve keeping a count of the control channel elements extracted up to this point and comparing it with the total number of control channel elements allocated for the control signaling. If the current control channel element is not the last one in the allocated resource block, the method 800 continues decoding the next control channel element at 804. Assembling the control signaling at block 808 may include extracting a part of the control signaling from each channel control element and combining parts from multiple control channel elements, if there is a need. In many cases, the control channel elements may be allocated consecutively and there is not a need to assemble the parts of the control signaling. However, for some dynamic allocation of resources and for maximum utilization of resource, the control channel elements may not be consecutively allocated. Validating the control signaling at block 810 may include checking data integrity of the assembled control signaling using a mechanism such as cyclic redundancy check.

A computer program product comprises a computer-readable medium bearing computer program code embodied therein for use with a computer or a central processor, the computer program code comprising code for allocating a control channel resource in a wireless relay transmission frame on a wireless relay link, code for generating a control signaling based on at least one of a resource allocation scheme, a status of relay link and a traffic condition, code for mapping the control signaling to the allocated control channel resource via one or more of a time-first mapping, a frequency-first mapping, and a multiplexing mapping, and code for transmitting the control signaling in the allocated control channel resource on the wireless relay link to at least one associated relay node.

Another computer program product comprises a computer-readable medium bearing computer program code embodied therein for use with a computer or a central processor, the computer program code comprising code for decoding a control channel element from a wireless relay transmission frame received at a relay node, code for extracting a starting indicator from the decoded control channel element, code for extracting at least a part of a control signaling from the decoded control element using the extracted starting indicator, code for assembling the control signaling, and code for validating the control signaling.

Without in any way limiting the scope, interpretation, or application of the claims appearing below, a technical effect of one or more of the example embodiments disclosed herein may be a wireless relay link between a wireless access node and a relay node that makes use of the unused bandwidth on a wireless transmission frame to carry control signaling. Another technical effect of one or more of the example embodiments disclosed herein may be a wireless relay control signaling that is configured to work with existing 3G user equipments as they are without changes.

Embodiments of the present invention may be implemented in software, hardware, application logic or a combination of software, hardware and application logic. The software, application logic and/or hardware may reside on a memory, a processor, a computing device or a wireless network node. If desired, part of the software, application logic and/or hardware may reside on a computing device or a network device, part of the software, application logic and/or hardware may reside on another network device, and part of the software, application logic and/or hardware may reside on a computing device or network device. The application logic, software or an instruction set is preferably maintained on any one of various conventional computer-readable media. In the context of this document, a "computer-readable medium" may be any media or means that may contain, store, communicate, propagate or transport the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention include other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A receiving device comprising:
   circuitry operable to process upper layer control signaling included in a first received signal, the upper layer control signaling including an indication of a location of a control resource located in at least one subframe, the location of the control resource including a start symbol and a number of symbols as time resources and including at least one physical resource blocks (PRBs) as a frequency resource, the at least one PRB including at least one control channel element (CCE) designated for the receiving device, and the upper layer control signaling indicating a multiplexing scheme for CCEs in the control resource; and
   circuitry operable to decode the at least one CCE from a received second signal using the upper layer control signaling to recover a control channel for the receiving device.

2. The receiving device of claim 1, wherein the multiplexing scheme for CCEs in the control resource is a time multiplexing scheme.

3. The receiving device of claim 1, wherein the multiplexing scheme for CCEs in the control resource is a frequency multiplexing scheme.

4. The receiving device of claim 1, wherein the at least one subframe is a long term evolution (LTE) subframe.

5. The receiving device of claim 1, wherein the receiving device is a user equipment (UE).

6. The receiving device of claim 1, wherein the first signal and the second signal are received from an eNB.

7. A method for use in a receiving device, the method comprising:

processing upper layer control signaling included in a first signal, the upper layer control signaling including an indication of a location of a control resource located in at least one subframe, the upper layer control signaling indicating a start symbol and a number of symbols as time resources and including at least one physical resource blocks (PRBs) as a frequency resource of the control resource, the at least one PRB including at least one control channel element (CCE) designated for the receiving device, and the upper layer control signaling indicating a multiplexing scheme for CCEs in the control resource; and decoding the at least one CCE from a received second signal using the upper layer control signaling to recover a control channel for the receiving device.

8. The method of claim 7, wherein the multiplexing scheme for CCEs in the control resource is a time multiplexing scheme.

9. The method of claim 7, wherein the multiplexing scheme for CCEs in the control resource is a frequency multiplexing scheme.

10. The method of claim 7, wherein the at least one subframe is a long term evolution (LTE) subframe.

11. The method of claim 7, wherein the receiving device is a user equipment (UE).

12. The method of claim 7, wherein the first signal and the second signal are received from an eNB.

13. A non-transitory computer readable medium that stores a set of instructions that when executed by a receiving device causes the receiving device to:

process upper layer control signaling included in a first signal, the upper layer control signaling including an indication of a location of a control resource located in at least one subframe, the upper layer control signaling indicating a start symbol and a number of symbols as time resources and including at least one physical resource blocks (PRBs) as a frequency resource of the control resource, the at least one PRB including at least one control channel element (CCE) designated for the receiving device, and the upper layer control signaling indicating a multiplexing scheme for CCEs in the control resource; and decode the at least one CCE from a received second signal using the upper layer control signaling to recover a control channel for the receiving device.

14. The non-transitory computer readable medium of claim 13, wherein the multiplexing scheme for CCEs in the control resource is a time multiplexing scheme.

15. The non-transitory computer readable medium of claim 13, wherein the multiplexing scheme for CCEs in the control resource is a frequency multiplexing scheme.

16. The non-transitory computer readable medium of claim 13, wherein the at least one subframe is a long term evolution (LTE) subframe.

17. The non-transitory computer readable medium of claim 13, wherein the receiving device is a user equipment (UE).

18. The non-transitory computer readable medium of claim 13, wherein the first signal and the second signal are received from an eNB.

* * * * *